(12) United States Patent
Lawrence et al.

(10) Patent No.: US 7,941,439 B1
(45) Date of Patent: May 10, 2011

(54) METHODS AND SYSTEMS FOR INFORMATION CAPTURE

(75) Inventors: Stephen R. Lawrence, Mountain View, CA (US); Christopher M. Prince, Mountain View, CA (US); Mihai Florin Ionescu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 958 days.

(21) Appl. No.: 10/814,773

(22) Filed: Mar. 31, 2004

(51) Int. Cl.
*G06F 7/00* (2006.01)

(52) U.S. Cl. ........ 707/769; 707/770; 707/802; 345/156; 345/173; 715/802; 715/803; 715/804; 719/313

(58) Field of Classification Search .................. None
See application file for complete search history.

(56) References Cited

U.S. PATENT DOCUMENTS

| | | | |
|---|---|---|---|
| 4,410,957 A * | 10/1983 | Cason et al. ................. | 345/172 |
| 5,280,612 A | 1/1994 | Lorie et al. | |
| 5,305,205 A * | 4/1994 | Weber et al. ................. | 715/234 |
| 5,321,838 A * | 6/1994 | Hensley et al. .............. | 717/125 |
| 5,539,809 A | 7/1996 | Mayer et al. | |
| 5,555,346 A | 9/1996 | Gross et al. | |
| 5,566,336 A | 10/1996 | Futatsugi et al. | |
| 5,592,378 A | 1/1997 | Cameron et al. | |
| 5,623,652 A | 4/1997 | Vora et al. | |
| 5,701,469 A | 12/1997 | Brandli et al. | |
| 5,742,816 A | 4/1998 | Barr et al. | |
| 5,748,954 A | 5/1998 | Mauldin | |
| 5,781,192 A * | 7/1998 | Kodimer ...................... | 715/770 |
| 5,793,948 A | 8/1998 | Asahi et al. | |
| 5,819,273 A | 10/1998 | Vora et al. | |
| 5,845,300 A | 12/1998 | Comer et al. | |
| 5,872,976 A | 2/1999 | Yee et al. | |
| 5,881,315 A | 3/1999 | Cohen | |
| 5,907,836 A | 5/1999 | Sumita et al. | |
| 5,956,722 A | 9/1999 | Jacobson | |
| 5,961,610 A | 10/1999 | Kelly et al. | |
| 5,964,839 A | 10/1999 | Johnson et al. | |
| 6,006,222 A | 12/1999 | Culliss | |
| 6,014,665 A | 1/2000 | Culliss | |
| 6,055,579 A | 4/2000 | Goyal et al. | |
| 6,073,130 A | 6/2000 | Jacobson et al. | |
| 6,078,916 A | 6/2000 | Culliss | |
| 6,115,802 A | 9/2000 | Tock et al. | |
| 6,119,147 A | 9/2000 | Toomey et al. | |

(Continued)

FOREIGN PATENT DOCUMENTS

JP          2001-5705        1/2001

(Continued)

OTHER PUBLICATIONS

U.S. Appl. No. 10/749,440, filed Dec. 31, 2003, Badros et al.

(Continued)

*Primary Examiner* — Tim T. Vo
*Assistant Examiner* — Hasanul Mobin
(74) *Attorney, Agent, or Firm* — Fenwick & West LLP

(57) ABSTRACT

Systems and methods for information capture from articles are described. In one embodiment, a plurality of keystrokes associated with an application is received, each keystroke is processed to determine an associated action forming a plurality of associated actions, and an event is determined based at least in part on the plurality of associated actions.

20 Claims, 4 Drawing Sheets

U.S. PATENT DOCUMENTS

| | | |
|---|---|---|
| 6,175,830 B1 | 1/2001 | Maynard |
| 6,182,065 B1 | 1/2001 | Yeomans |
| 6,182,068 B1 | 1/2001 | Culliss |
| 6,184,880 B1 | 2/2001 | Okada |
| 6,199,067 B1 | 3/2001 | Geller |
| 6,202,065 B1 | 3/2001 | Wills |
| 6,209,000 B1 | 3/2001 | Klein et al. |
| 6,226,630 B1 | 5/2001 | Billmers |
| 6,236,768 B1 | 5/2001 | Rhodes et al. |
| 6,236,978 B1 | 5/2001 | Tuzhilin |
| 6,240,548 B1 | 5/2001 | Holzle et al. |
| 6,269,369 B1 | 7/2001 | Robertson |
| 6,275,820 B1 | 8/2001 | Navin-Chandra et al. |
| 6,275,957 B1 | 8/2001 | Novik et al. |
| 6,282,548 B1 | 8/2001 | Burner et al. |
| 6,321,228 B1 | 11/2001 | Crandall et al. |
| 6,341,371 B1 | 1/2002 | Tandri |
| 6,347,374 B1 | 2/2002 | Drake et al. |
| 6,349,299 B1 | 2/2002 | Spencer et al. |
| 6,363,373 B1 | 3/2002 | Steinkraus |
| 6,380,924 B1 * | 4/2002 | Yee et al. ............ 345/156 |
| 6,393,421 B1 | 5/2002 | Paglin |
| 6,393,438 B1 | 5/2002 | Kathrow et al. |
| 6,401,239 B1 | 6/2002 | Miron |
| 6,446,076 B1 | 9/2002 | Burkey et al. |
| 6,477,585 B1 | 11/2002 | Cohen et al. |
| 6,480,837 B1 | 11/2002 | Dutta |
| 6,490,577 B1 | 12/2002 | Anwar |
| 6,513,036 B2 | 1/2003 | Fruensgaard et al. |
| 6,526,405 B1 | 2/2003 | Mannila et al. |
| 6,532,023 B1 | 3/2003 | Schumacher et al. |
| 6,560,655 B1 | 5/2003 | Grambihler et al. |
| 6,564,213 B1 | 5/2003 | Ortega et al. |
| 6,581,056 B1 | 6/2003 | Rao |
| 6,592,627 B1 | 7/2003 | Agrawal et al. |
| 6,604,236 B1 | 8/2003 | Draper et al. |
| 6,631,345 B1 * | 10/2003 | Schumacher et al. ......... 703/22 |
| 6,658,423 B1 | 12/2003 | Pugh et al. |
| 6,681,247 B1 | 1/2004 | Payton |
| 6,684,250 B2 | 1/2004 | Anderson et al. |
| 6,691,175 B1 | 2/2004 | Lodrige et al. |
| 6,694,353 B2 | 2/2004 | Sommerer |
| 6,697,838 B1 | 2/2004 | Jakobson |
| 6,707,471 B2 | 3/2004 | Funaki |
| 6,708,293 B2 | 3/2004 | Kaler et al. |
| 6,728,763 B1 | 4/2004 | Chen |
| 6,772,143 B2 | 8/2004 | Hung |
| 6,779,030 B1 | 8/2004 | Dugan et al. |
| 6,782,381 B2 | 8/2004 | Nelson et al. |
| 6,820,075 B2 | 11/2004 | Shanahan et al. |
| 6,826,553 B1 | 11/2004 | DaCosta et al. |
| 6,850,934 B2 | 2/2005 | Bates et al. |
| 6,853,950 B1 | 2/2005 | O'Reilly et al. |
| 6,864,901 B2 | 3/2005 | Chang et al. |
| 6,865,715 B2 | 3/2005 | Uchino et al. |
| 6,873,982 B1 | 3/2005 | Bates et al. |
| 6,877,027 B1 | 4/2005 | Spencer et al. |
| 6,879,691 B1 | 4/2005 | Koretz |
| 6,901,378 B1 | 5/2005 | Linker et al. |
| 6,907,577 B2 * | 6/2005 | Tervo ............ 715/827 |
| 6,934,740 B1 | 8/2005 | Lawande et al. |
| 6,957,229 B1 | 10/2005 | Dyor |
| 6,963,830 B1 | 11/2005 | Nakao |
| 6,968,509 B1 * | 11/2005 | Chang et al. ............ 715/802 |
| 6,981,040 B1 | 12/2005 | Konig et al. |
| 6,983,310 B2 | 1/2006 | Rouse et al. |
| 6,985,913 B2 | 1/2006 | Murata |
| 6,999,957 B1 | 2/2006 | Zamir et al. |
| 7,016,919 B2 | 3/2006 | Cotton et al. |
| 7,080,073 B1 | 7/2006 | Jiang et al. |
| 7,096,255 B2 | 8/2006 | Malik |
| 7,099,887 B2 | 8/2006 | Hoth et al. |
| RE39,326 E | 10/2006 | Comer et al. |
| 7,162,473 B2 | 1/2007 | Dumais et al. |
| 7,188,316 B2 | 3/2007 | Gusmorino et al. |
| 7,200,802 B2 | 4/2007 | Kawatani |
| 7,233,948 B1 | 6/2007 | Shamoon et al. |
| 7,240,049 B2 | 7/2007 | Kapur |
| 7,245,910 B2 | 7/2007 | Osmo |
| 7,249,158 B2 | 7/2007 | Naitou |
| 7,257,822 B1 | 8/2007 | Sambhus et al. |
| 7,265,858 B2 | 9/2007 | Park et al. |
| 7,328,242 B1 | 2/2008 | McCarthy et al. |
| 7,330,536 B2 | 2/2008 | Claudatos et al. |
| 7,337,448 B1 | 2/2008 | Dalia et al. |
| 7,343,365 B2 | 3/2008 | Farnham et al. |
| 7,376,640 B1 | 5/2008 | Anderson et al. |
| 7,383,307 B2 | 6/2008 | Kirkland et al. |
| 7,412,491 B2 | 8/2008 | Gusler et al. |
| 7,437,444 B2 | 10/2008 | Houri |
| 7,457,872 B2 | 11/2008 | Aton et al. |
| 7,467,390 B2 | 12/2008 | Gilgen et al. |
| 7,475,406 B2 | 1/2009 | Banatwala et al. |
| 7,499,974 B2 | 3/2009 | Karstens |
| 7,500,249 B2 | 3/2009 | Kampe et al. |
| 7,546,602 B2 * | 6/2009 | Hejlsberg et al. ............ 719/313 |
| 7,562,367 B1 | 7/2009 | Arad |
| 7,577,667 B2 | 8/2009 | Hinshaw et al. |
| 7,602,382 B2 * | 10/2009 | Hinckley et al. ............ 345/173 |
| 2001/0016852 A1 | 8/2001 | Peairs et al. |
| 2002/0042789 A1 | 4/2002 | Michalewicz et al. |
| 2002/0049608 A1 | 4/2002 | Hartsell et al. |
| 2002/0056089 A1 | 5/2002 | Houston |
| 2002/0059245 A1 | 5/2002 | Zakharov et al. |
| 2002/0059425 A1 | 5/2002 | Belfiore et al. |
| 2002/0065802 A1 | 5/2002 | Uchiyama |
| 2002/0073076 A1 | 6/2002 | Xu et al. |
| 2002/0078256 A1 | 6/2002 | Gehman et al. |
| 2002/0087507 A1 | 7/2002 | Hopewell et al. |
| 2002/0091568 A1 | 7/2002 | Kraft et al. |
| 2002/0091972 A1 | 7/2002 | Harris et al. |
| 2002/0103664 A1 | 8/2002 | Olsson et al. |
| 2002/0116291 A1 | 8/2002 | Grasso et al. |
| 2002/0138467 A1 | 9/2002 | Jacobson et al. |
| 2002/0156760 A1 | 10/2002 | Lawrence et al. |
| 2002/0165903 A1 | 11/2002 | Zargham et al. |
| 2002/0174101 A1 | 11/2002 | Fernley et al. |
| 2002/0178383 A1 | 11/2002 | Hrabik et al. |
| 2002/0184224 A1 | 12/2002 | Haff et al. |
| 2002/0184406 A1 | 12/2002 | Aliffi |
| 2003/0001854 A1 * | 1/2003 | Jade et al. ............ 345/581 |
| 2003/0018521 A1 | 1/2003 | Kraft et al. |
| 2003/0023586 A1 | 1/2003 | Knorr |
| 2003/0028506 A1 | 2/2003 | Yu |
| 2003/0028896 A1 | 2/2003 | Swart et al. |
| 2003/0036848 A1 | 2/2003 | Sheha et al. |
| 2003/0041112 A1 | 2/2003 | Tada et al. |
| 2003/0050909 A1 | 3/2003 | Preda et al. |
| 2003/0055816 A1 | 3/2003 | Paine et al. |
| 2003/0055828 A1 | 3/2003 | Koch et al. |
| 2003/0088433 A1 | 5/2003 | Young et al. |
| 2003/0097361 A1 | 5/2003 | Huang et al. |
| 2003/0123442 A1 | 7/2003 | Drucker et al. |
| 2003/0123443 A1 | 7/2003 | Anwar |
| 2003/0126136 A1 | 7/2003 | Omoigui |
| 2003/0130984 A1 | 7/2003 | Quinlan et al. |
| 2003/0131000 A1 | 7/2003 | Bates et al. |
| 2003/0149694 A1 | 8/2003 | Ma et al. |
| 2003/0154071 A1 | 8/2003 | Shreve |
| 2003/0167266 A1 | 9/2003 | Saldanha et al. |
| 2003/0182480 A1 | 9/2003 | Varma et al. |
| 2003/0187837 A1 | 10/2003 | Culliss |
| 2003/0233366 A1 | 12/2003 | Kesselman |
| 2004/0002959 A1 | 1/2004 | Alpert et al. |
| 2004/0003038 A1 | 1/2004 | Huang et al. |
| 2004/0031027 A1 | 2/2004 | Hiltgen |
| 2004/0054737 A1 | 3/2004 | Daniell |
| 2004/0064447 A1 | 4/2004 | Simske et al. |
| 2004/0093317 A1 | 5/2004 | Swan |
| 2004/0095852 A1 | 5/2004 | Griner et al. |
| 2004/0098609 A1 | 5/2004 | Bracewell et al. |
| 2004/0103409 A1 | 5/2004 | Hayner et al. |
| 2004/0128285 A1 | 7/2004 | Green et al. |
| 2004/0133560 A1 | 7/2004 | Simske |
| 2004/0133561 A1 | 7/2004 | Burke |
| 2004/0143569 A1 | 7/2004 | Gross et al. |
| 2004/0155910 A1 | 8/2004 | Chang et al. |

| | | |
|---|---|---|
| 2004/0168150 A1 | 8/2004 | Ziv |
| 2004/0186848 A1 | 9/2004 | Kobashikawa et al. |
| 2004/0186896 A1 | 9/2004 | Daniell et al. |
| 2004/0187075 A1 | 9/2004 | Maxham et al. |
| 2004/0193596 A1 | 9/2004 | Defelice et al. |
| 2004/0203642 A1 | 10/2004 | Zatloufai et al. |
| 2004/0205773 A1 | 10/2004 | Carcido et al. |
| 2004/0215715 A1 | 10/2004 | Ehrich et al. |
| 2004/0230572 A1 | 11/2004 | Omoigui |
| 2004/0235520 A1 | 11/2004 | Cadiz et al. |
| 2004/0254928 A1 | 12/2004 | Vronay et al. |
| 2004/0254938 A1 | 12/2004 | Marcjan et al. |
| 2004/0255301 A1 | 12/2004 | Turski et al. |
| 2004/0261026 A1 | 12/2004 | Corson |
| 2004/0267700 A1 | 12/2004 | Dumais et al. |
| 2004/0267756 A1 | 12/2004 | Bayardo et al. |
| 2005/0021542 A1 | 1/2005 | Irle et al. |
| 2005/0033803 A1 | 2/2005 | Vleet et al. |
| 2005/0050547 A1 | 3/2005 | Whittle et al. |
| 2005/0057584 A1 | 3/2005 | Gruen et al. |
| 2005/0060310 A1 | 3/2005 | Tong et al. |
| 2005/0060719 A1* | 3/2005 | Gray et al. ............... 719/318 |
| 2005/0076115 A1 | 4/2005 | Andrews et al. |
| 2005/0108213 A1 | 5/2005 | Riise et al. |
| 2005/0108332 A1 | 5/2005 | Vaschillo et al. |
| 2005/0114021 A1 | 5/2005 | Krull et al. |
| 2005/0114487 A1 | 5/2005 | Peng et al. |
| 2005/0192921 A1 | 9/2005 | Chaudhuri et al. |
| 2005/0251526 A1 | 11/2005 | Nayak |
| 2005/0262073 A1 | 11/2005 | Reed et al. |
| 2006/0031365 A1 | 2/2006 | Kay et al. |
| 2006/0085750 A1 | 4/2006 | Easton et al. |
| 2006/0106778 A1 | 5/2006 | Baldwin |
| 2006/0167704 A1 | 7/2006 | Nicholls et al. |
| 2006/0190470 A1 | 8/2006 | Lemnotis |
| 2006/0224553 A1 | 10/2006 | Chtcherbatchenko et al. |
| 2006/0288075 A1 | 12/2006 | Wu |
| 2007/0016556 A1 | 1/2007 | Ann et al. |
| 2007/0022155 A1 | 1/2007 | Owens et al. |
| 2007/0055689 A1 | 3/2007 | Rhoads et al. |
| 2007/0078860 A1 | 4/2007 | Enenkiel |
| 2007/0208697 A1 | 9/2007 | Subramaniam et al. |

FOREIGN PATENT DOCUMENTS

| | | |
|---|---|---|
| RU | 2138076 C1 | 9/1999 |
| WO | WO 01/62004 A2 | 8/2001 |
| WO | WO 02/069118 | 9/2002 |
| WO | WO 2005/006129 A2 | 1/2005 |

OTHER PUBLICATIONS 80-20 Software—Products—80-20 One Search, http://www,80-20.com/products/one-search/retriever.asp, printed Mar. 16, 2004.
"askSam™ Making Information Useful," askSam,—Organize your information with askSam, http://www.asksam.com/brochure.asp, printed Mar. 15, 2004.
Alexa® Web Search—Toolbar Quick Tour, http://pages.alexa.com/prod_serv/quicktour.html, pp. 1-5, printed Mar. 16, 2004.
Barrett, R. et al., "How to Personalize the Web," IBM Research, http://www.almaden.ibm.com/cs/wbi/papers/chi97/wbipaper.html, pp. 1-13, printed Mar. 16, 2004.
Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.
Boyan, J., et al., "A Machine Learning Architecture for Optimizing Web Search Engines," School of Computer Science, Carnegie Mellon University, May 10, 1996, pp. 1-8.
Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.
Brin, S., et al, "The Anatomy of a Large-Scale Hypertextual Web Search Engine," http://www7.scu.edu.au/programme/fullpapers/1921/com1921.htm, pp. 1-18, 1998.
Budzik, J., et al., User Interactions with Everyday Applications as Context for Just-In-time Information Access, Intelligent Information Laboratory, Northwestern University, pp. 1-8, no date.
DEVONthink, http://www.devon-techonoloqies.com/products/devonthink.php, printed Mar. 16, 2004.
dtSearch®-http://www.dtsearch.com/, printed Mar. 15, 2004.
Dumais, S., et al, "Stuff I've Seen: A System for Personal Information Retrieval and Re-Use," Microsoft Research, *SIGIR '03*, Jul. 28-Aug. 1, 2003, pp. 1-8.
Enfish, http://www.enfish.com, printed Mar. 16, 2004.
Fast Search & Transfer—Home—Enterprise Search, http://solutions.altavista.com/en/news/pr_020402_desktop.shtmu, printed Mar. 16, 2004.
Fertig, S., et al., "Lifestreams: An Alternative to the Desktop Metaphor," http://www.acm.org/sigchi/chi96/proceedings/videos/Fertig/etf,htm, pp. 1-3, printed Mar. 16, 2004.
Geisler, G., "Enriched Links: A Framework for Improving Web Navigation Using Pop-Up Views," pp. 1-14, 2000.
ISYS Search Software—ISYS: desktop, http://www.isysusa.com/products/desktop/index.html, printed Mar. 16, 2004.
Joachims, T., et al., "WebWatcher. A Tour Guide for the World Wide Web," 1996.
Markoff, J., "Google Moves Toward Clash with Microsoft," *The New York Times*, May 19, 2004, http://www.nytimes.com/2004/5/19/technology/19google,html?ex=1085964389&ei=1&e..., pp. 1-4, printed May 19, 2004.
Naraine, R., "Future of Search Will Make You Dizzy," Enterprise, May 20, 2004, http://www.internetnews.com/ent-news/article.php/3356831 pp. 1-4, printed May 21, 2004.
"Overview," Stuff I've Seen—Home Page, http://research.Microsoft.com/adapt/sis/index.htm, pp. 1-2, printed May 26, 2004.
Rhodes, B., "Margin Notes Building a Contextually Aware Associative Memory," *The Proceedings of the International Conference on Intelligent User Interfaces (IUI'00)*, Jan. 9-12, 2000.
Rhodes, B., et al., "Just-in-time information retrieval agents," *Systems Journal*, vol. 39, Nos. 3&4, 2000, pp. 685-704.
Rhodes, B., et al., "Remembrance Agent—A continuously running automated Information retrieval system," *The Proceedings of the First International Conference on the Practical Application of Intelligent Agents and Multi Agent Technology* (PAAM '96), pp. 487-495.
Rizzo, T., "WinFS 101: Introducing the New Windows File System," Longhorn Developer Center Home: Headline Archive: WinFS 101: Introducing the New . . . , http://msdn.Microsoft.com/Longhorn/archive/defaultaspx?pull+/library/en-us/dnwinfs/htm..., pp. 1-5, printed Apr. 21, 2004.
"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.
"Selecting Task-Relevant Sources for Just-In-Time Retrieval," pp. 1-3, no date.
Sherman, C., "HotBot's New Desktop Search Toolbar," www.searchenginewatch.com, http://searchenginewatch.com/searchday/print.php/34711_339921 pp. 1-3, printed Apr. 14, 2004.
"Standardization Priorities for the Directory—Directory Interoperability Forum White Paper," The Open Group, Dec. 2001, pp. 1-21.
Sullivan, D., "Alta Vista Releases Search Software," *The Search Engine Report*, Aug. 4, 1998, pp. 1-2.
WebWatcher Home Page, "Welcome to the WebWatcher Project," http://www-2.cs.cmu.edu/~webwatcher/, printed Oct. 15, 2003.
"WhenU Just-In-Time Marketing," http://www.whenu.com, printed Mar. 19, 2004.
X1 instantly searches files & email. For outlook, Outlook, http://www.x1.com/, printed Mar. 15, 2004.
Zellweger, P., et al., "Fluid Links for Informed and Incremental Link Transitions," Proceedings of Hypertext'98, Pittsburgh, PA, Jun. 20-24, 1998, pp. 50-57.
Bengel, J., et al., "Archiving and Indexing Chat Utterances," Electrical Engineering and Computer-Science and Information Technology Telecommunications Center University of Kansas, 2003.
Huang, Q., et al., Multimedia Search and Retrieval: New Concepts, System Implementation, and Application, Circuits and Systems for Video Technology, IEEE Transaction s on Circuits and Systems for Video Technology, Aug. 2000, pp. 679-692, vol. 10. Issue 5.

Pingali, G. S., et al., "Instantly Indexed Multimedia Databases of Real World Events," IEEE Transactions on Multimedia, Jun. 2002, pp. 269-282, vol. 4, Issue 2.

Sengupta, S., et al., Designing a Value Based Niche Search Engine Using Evolutionary Strategies, Proceedings of the International Conference of Information Technology: Coding and Computing (ITCC'05), IEEE, 2005, Pennsylvania State University.

PCT International Search Report and Written Opinion, PCT/US05/10687, Sep. 10, 2008, 14 Pages.

PCT International Search Report and Written Opinion, PCT/US05/10685, Jul. 3, 2008, 11 Pages.

Examination Report, European Patent Application No. 05731427.0, Jul. 28, 2008, 5 Pages.

European Examination Report, European Application No. EP 05731490.8, Jul. 7, 2008, 5 pages.

European Search Report, European Application No. EP 05731490.8, Apr. 28, 2008, 4 pages.

Bacon, J. et al., "Event Storage and Federation Using ODMG," 2000, pp. 265-281, vol. 2135, [online] Retrieved from the Internet<URL: http://citeseer.ist.psu.edu/bacon00event.html>.

Spiteri, M.D. et al., "An Architecture to Support Storage and Retrieval of Events," Sep. 1998, pp. 443-458, [online] Retrieved from the Internet<URL:http://citeseer.ist.psu.edu/spiteri98architecture.html>.

Spiteri, M.D., "An Architecture for the Notification, Storage and Retrieval of Events," Jan. 2000, pp. 1-165 pages, [online] Retrieved from the Internet<URL:http://citeseer.ist.psu.edu/spiteri00architecture.html>.

Jonathan Bennett & AutoIt Team, "AutoIt v3 Homepage," Verson v3.0.102, 1999-2004, 26 pages, [online] [Archived on Aug. 13, 2004; Retrieved on Dec. 2, 2008] Retrieved from the internet <URL:http://web.archive.org/web/20040813195143/http://www.autoitscript.com/autoit3/docs/>.

Budzik, J., "Information access in context," Knowledge-Based Systems, Elsevier 2001, pp. 37-53, vol. 14.

Gemmell, J., et al., "Living with a Lifetime Store," Proc. ATR Workshop on Ubiquitous Experience Media, Sep. 9-10, 2003, pp. 69-76.

Gemmell, J., et al., "The MyLifeBits Lifetime Store," Proceedings of the 2003 ACM SIGMM Workshop on Experimental Telepresence, Nov. 7, 2003, pp. 80-83.

Rekimoto, J., "Time-Machine Computing: A Time-centric Approach for the Information Environment," Proceedings of the Annual ACM Symposium on User Interface Software and Technology, Nov. 7, 1999, pp. 1-10.

U.S. Appl. No. 10/814,773, filed Mar. 31, 2004, Lawrence et al.

"About Spector CNE," Spectorsoft, 1 page, [online] [Retrieved on May 23, 2007] Retrieved from the Internet: URL: http://www.spectorsoft.com/products/spectorcne_windows/help/v40/webhelp/About_Spector_CNE>.

Knezevic, P. et al., "The Architecture of the Obelix—An Improved Internet Search Engine," Proceedings of the $33^{rd}$ Annual Hawaii International Conference on System Sciences (HICSS) Jan. 4-7, 2000, Maui, HI, USA, pp. 2145-2155.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

"Spector Corporate Network Edition 4.0 (Spector CNE) Online User Manual," SpectorSoft Corporation, 2003, [online] [retrieved on May 12, 2005] Retrieved from the Internet: <URL: http://www.spectorsoft.com/products/ spectorcne_windows/help/v40/webhelp/>.

International Preliminary Report on Patentabiity, PCT/US2005/003386, Jun. 24, 2005, 8 pages.

International Search Report and Written Opinion, PCT/US2005/003386, Jun. 28, 2005.

International Search Report and Written Opinion, PCT/US2005/010985, Apr. 26, 2007, 9 pages.

International Search Report and Written Opinion, PCT/US2004/038562, Apr. 6, 2005.

* cited by examiner

# METHODS AND SYSTEMS FOR INFORMATION CAPTURE

FIELD OF THE INVENTION

The invention generally relates to search engines. More particularly, the invention relates to methods and systems for information capture.

BACKGROUND OF THE INVENTION

Users generate and access a large number of articles, such as emails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users sometimes wish to search the storage device(s) for articles.

Conventional client-device search applications may significantly degrade the performance of the client device. For example, certain conventional client-device search applications typically use batch processing to index all articles, which can result in noticeably slower performance of the client device during the batch processing. Additionally, batch processing occurs only periodically. Therefore, when a user performs a search, the most recent articles are sometimes not included in the results. Moreover, if the batch processing is scheduled for a time when the client device is not operational and is thus not performed for an extended period of time, the index of articles associated with the client device can become outdated. Conventional client-device search applications can also need to rebuild the index at each batch processing or build new partial indexes and perform a merge operation that can use a lot of client-device resources. Conventional client-device search applications also sometimes use a great deal of system resources when operational, resulting in slower performance of the client device.

Additionally, conventional client-device search applications can require an explicit search query from a user to generate results, and may be limited to examining file names or the contents of a particular application's files.

SUMMARY

Embodiments of the present invention comprise methods and systems for information capture. In one embodiment, a plurality of keystrokes associated with an application is received, each keystroke is processed to determine an associated action forming a plurality of associated actions, and an event is determined based at least in part on the plurality of associated actions. In another embodiment, a plurality of display calls associated with an application are received, the plurality of display calls are processed to determine a display, and an event is determined based at least in part on the display.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
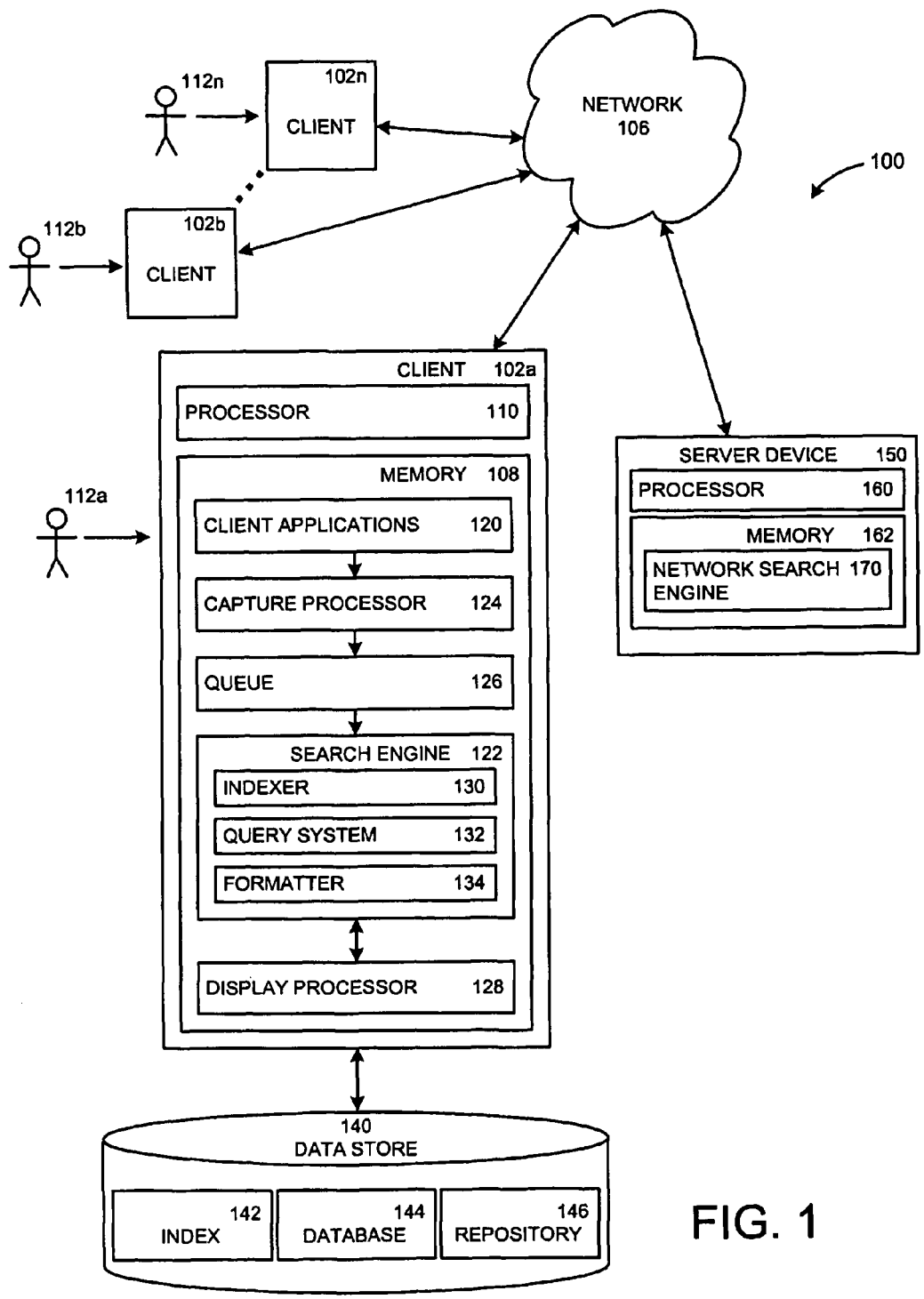
FIG. 1 is a diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102a-n that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102a-n shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an email or performing a scheduled task.

The memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language-Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and extracting event data associated with an event. Examples of events include sending or receiving an instant messenger message, a user viewing a web page, saving a word processing document, printing a spreadsheet document, inputting text to compose or edit an email, opening a presentation application, closing an instant messenger application, entering a keystroke, moving the mouse, and hovering the mouse over a hyperlink. An example of event data captured by the capture processor 124 for an event involving the viewing of a web page by a user includes the URL of the web page, the time and date the user viewed the web page, and the content of the web page.

In one embodiment, the capture processor 124 may comprise multiple capture components. For example, the capture processor 124 can comprise a separate capture component for each client application in order to capture events associated with each application. The capture processor 124 can also comprise a separate capture component to monitor and capture keystrokes input by the user and a separate capture component that can monitor and capture items, such as text, displayed on a display device associated with the client device 102a. The keystroke capture component and the display capture component can be used to capture events when a client application capture component is not available for a client application or in conjunction with a client application capture component. The keystroke capture component can also contain or access a keystroke database. The keystroke database can provide correlation between keystrokes and actions for applications. The keystroke capture component and the display capture component can also contain or access a history of previous keyboard or display events.

In one embodiment, the capture processor 124 can comprise a separate capture component that monitors overall network activity in order to capture event data associated with network activity, such as the receipt of an instant messenger message. The capture processor 124 can comprise a separate capture component that monitors overall client device performance data, such as processor load, idle time, disk access, the client applications in use, and the amount of memory available. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schemas can differ depending on the client application or activity the capture component is monitoring. Generally, the event schema can describe the format for an event, for example, by providing fields for event data associated with the event (such as time of the event) and fields related to any associated article (such as title) as well as the content of any associated article (such as document body). An event schema can describe the format for any suitable event data that relates to an event. For example, an event schema for user input, such as words typed or displayed to a display device, can include the application used for the input, the format of the text, the words and other items input, and the time input. An event schema for an email event received by a user can include header information, such as the content from the subject, to, from, cc, and time received fields, and body information. An event schema for a web page currently being viewed by a user can include the Uniform Resource Locator (URL) of the web page, the time being viewed, and the content of the web page. An event schema for a word processing document being saved by a user can include the title of the document, the time saved, the location of the document, the format of the document, the text of the document, and a pointer to the location of the document.

In one embodiment, the keyboard capture component may not use an event schema. Rather, in this embodiment, the keyboard capture component can convert keystrokes to a sequence of words and then can pass the sequence of words to another component, such as the word processing capture component. The word processing capture can use an event schema to express information sent by the keystroke capture component.

More generally, an event schema can describe the state of the system around the time of the event. For example, an event schema can contain a URL for a web page event associated with a previous web page that the user navigated from. In addition, event schemas can describe fields with more complicated structure like lists. For example, an event schema can contain fields that list multiple recipients. An event schema can also contain optional fields so that an application can include additional event data if desired.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message or email. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an email or pasting a sentence in a word processing document, closing an article, such as closing an instant messenger window or changing an email message being viewed, loading, saving, opening, or viewing an article, such as a word processing document, web page, or email, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102*a* was operational or because no capture component existed for a specific type of historical event at the time the event took place. Examples of historical events include the user's saved word processing documents, media files, presentation documents, calendar entries, and spreadsheet documents, the emails in a user's inbox, and the web pages bookmarked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102*a*. For example, the email application may have to retrieve emails from a server device. In one embodiment, the search engine 122 indexes historical events.

In the embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126 or how detailed the events are that are sent (fewer or smaller events when the system is busy) or how frequently events are sent (events are sent less often when the system is busy or there are too many events waiting to be processed). The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a multiple-priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language-Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 can contain an indexer 130, a query system 132, and a formatter 134. The query system 132 can retrieve all real-time events and performance data from the queue 126. The query system 132 can use performance data and real-time events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one or combination of methods for storing data, including without limitation, arrays, hash tables, lists, and pairs, and may include compression and encryption. In the embodiment shown in FIG. 1, the data store comprises an index 142, a database 144 and a repository 146.

In the embodiment shown in FIG. 1, when the indexer 130 receives an event, the indexer 130 can determine, from the event schema, terms (if any) associated with the event, the time of the event (if available), images (if any) associated with the event, and/or other information defining the event. The indexer 130 can also determine if the event relates to other events and associate the event with related events. For example, for an event concerning a web page, the indexer 130 can associate this event with other events concerning the same web page. This association information can be stored in the database 133 in a document for each group of related events.

The indexer 130 can send and incorporate the terms and times, associated with the event in the index 142 of the data store 140. The event can be sent to the database 144 for storage and the content of the associated article and any associated images can be stored in the repository 146. The conversation object associated with instant messenger messages can be stored in the database 144.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's emails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a.

The formatter 134 can receive the search result set from the query system 132 of the search engine 122 and can format the results for output to a display processor 128. In one embodiment, the formatter 134 can format the results in XML, HTML, or tab delineated text. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including, for example as, DLL exports, COM interface, VB, JAVA, or .NET libraries, or as a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102a-n, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a network search engine 170. The search engine 170 can locate relevant information from the network 106 in response to a search query from a client device 102*a*. The search engine 170 then can provide a result set to the client device 102*a* via the network 106. The result set can comprise one or more article identifiers. An article identifier may be, for example, a Uniform Resource Locator (URL), a file name, a link, an icon, a path for a local file, or anything else that identifies an article. In one embodiment, an article identifier can comprise a URL associated with an article.

In one embodiment, the server device 150, or related device, has previously performed a crawl of the network 106 to locate articles, such as web pages, stored at other devices or systems coupled to the network 106, and indexed the articles in memory 162 or on another data storage device.

It should be noted that other embodiments of the present invention may comprise systems having different architecture than that which is shown in FIG. 1. For example, in some other embodiments of the present invention, the client device 102*a* is a stand alone device and is not coupled to a network. The system 100 shown in FIG. 1 is merely exemplary, and is used to explain the exemplary methods shown in FIGS. 2 through 4.

Various methods in accordance with the present invention may be carried out. For example, in one embodiment, a plurality of keystrokes associated with an application is received, each keystroke is processed to determine an associated action forming a plurality of associated actions, and an event is determined based at least in part on the plurality of associated actions. An application in focus can first be determined.

In one embodiment, the event can be a number of words and it can be determined that the plurality of associated actions forms a word or words. The word or words can be determined at least in part by the receipt of at least one keystroke indicating a space or a punctuation symbol. In another embodiment, the event can be a number of characters and it can be determined that the plurality of associated actions form a character or characters.

In one embodiment, a capture state can be updated after each keystroke is processed. In one embodiment, a current user state can be updated based at least in part on the event. The event can be indexed and stored.

In one embodiment, each associated action can be determined at least in part by matching the keystroke to an entry in a keystroke table and determining an action in the keystroke table associated with the entry. The action can comprise one of adding a character to a word, deleting a character from a word, inserting a character, overwriting a character, deleting a word, deleting a paragraph, selecting an item, and repositioning the cursor. The keystroke table can be associated with the application or can be a generic keystroke table.

In another embodiment, a plurality of keystrokes are received associated with an application, an event is determined based on user input, and it is determined whether to index the event. User input can be one or more of a number of words determined from the plurality of keystrokes, a number of characters determined from the plurality of keystrokes, and a change is focus from the application to another application. Whether to index the event can comprise determining whether the event is important to the user.

In another embodiment, a plurality of display calls associated with an application are received, the plurality of display calls are processed to determine a display, and an event is determined based at least in part on the display. The display can be determined at least in part by using an array of a current state of the display and updating the array with the display call and can be determined at least in part by constructing display items based at least in part on display positions of the display calls. The plurality of display calls can be processed by one or more of analyzing one or more of the x,y coordinates, lengths, and relative positions of a plurality of items written to the display using display calls.

In one embodiment, an application in focus is first determined. In one embodiment, the event is a number of words and it can be determined that the display includes a word or words. In one embodiment, a capture state can be updated after each display call is processed and a current user state can be updated based at least in part on the event.

In one embodiment, it can be determined whether to index the event and the event can be indexed and stored if it is so determined.

Figure 2:
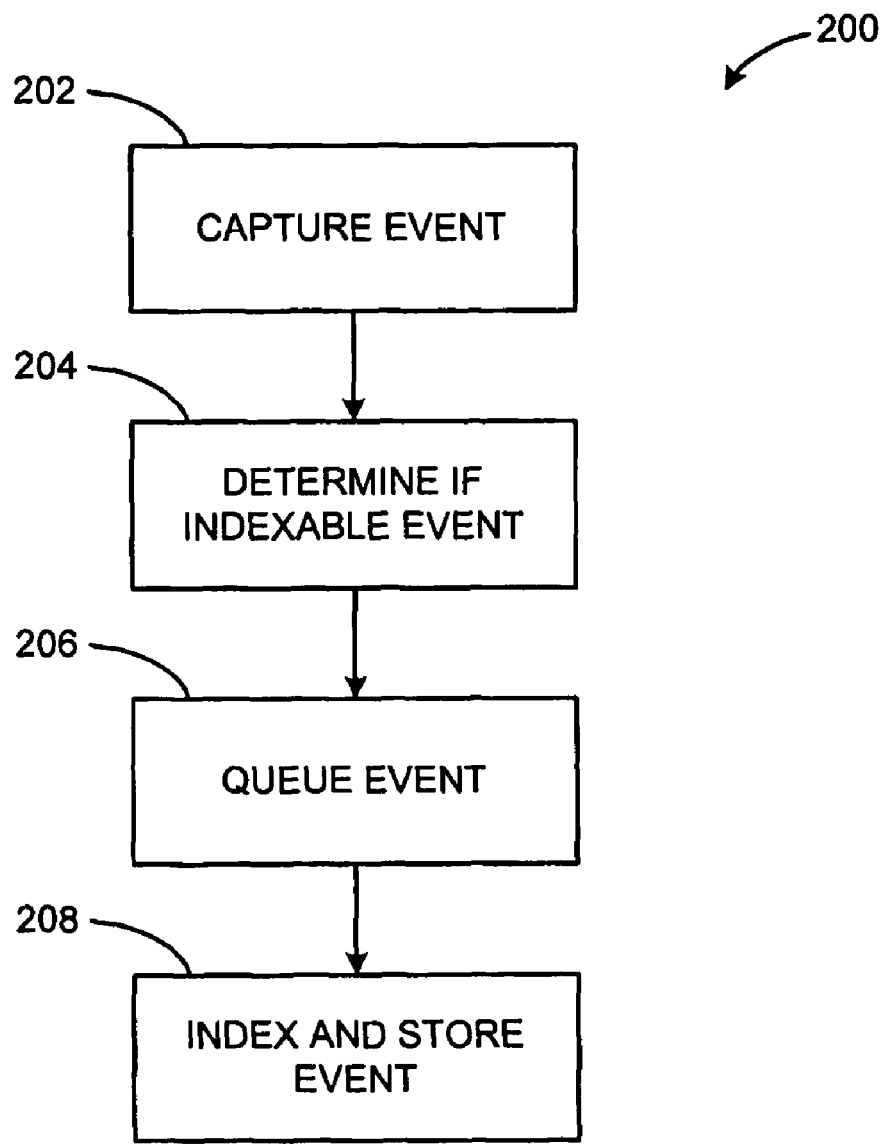
FIG. 2 is a flow diagram illustrating an exemplary method of capturing and processing event data associated with a client device in one embodiment of the present invention.

FIG. 2 illustrates an exemplary method 200 that provides a method for capturing and processing a real-time event. This exemplary method is provided by way of example, as it will be appreciated from the foregoing description of exemplary embodiments there are a variety of ways to carry out methods in other embodiments of the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, the capture processor 124 captures an event. The capture processor 124 can capture an event by identifying and compiling event data associated with the event upon the occurrence of the event. The capture processor 124 may have separate capture components for each client application, network monitoring, performance data capture, keystroke capture, and display capture. For example, an event can occur when a user 112*a* types a predetermined number of words in a client application. The event data associated with this event can be, for example, the application used for the input, the format of the text, the words input, and the time input. In one embodiment, the capture component can use a generalized event definition mechanism, such as an event schema that it has previously registered with the client device 102*a*, to capture or express the event.

Figure 3:
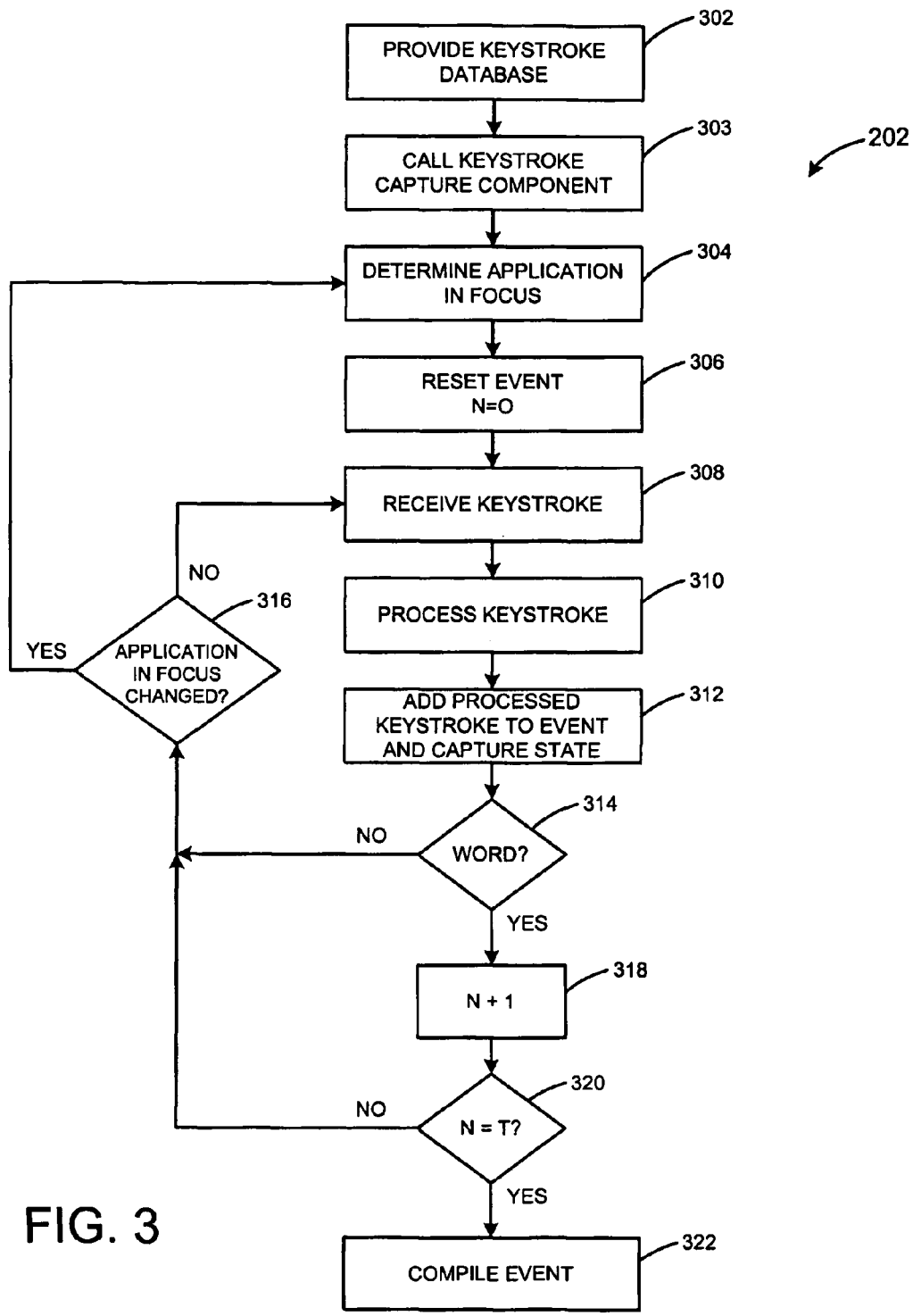
FIG. 3 is a flow diagram illustrating an exemplary method of capturing keystroke information on a client device in one embodiment of the present invention.

FIG. 3 provides an example of capturing a real-time event of step 202. Specifically, FIG. 3 illustrates an exemplary method for capturing keystrokes from a user 112*a*. In 302, a keystroke database is provided. The keystroke database can contain, for various client applications, tables of keystroke commands and the respective action for each command. In one embodiment, the keystroke database has a separate table for each separate client application. A generic table may be used for an application if a specific table does not exist for the particular application. In one embodiment, the same table may be used for groups of applications. For example, the same table may be used for applications from the same developer. For example, the same table may be used for all Microsoft® applications and a different table may be used for all applications from Lotus®. Additionally, the same table may be used for related applications, such as Office® applications from Microsoft®, or word processing applications from any developer. The keystroke tables can be created manually for each application. Alternatively, the keystroke tables can be created automatically by automatically determining respective actions of each keystroke for each application.

In 303, the keystroke capture component is called. The keystroke capture component can operate regularly or even constantly so that it monitors all keystroke activity or can be selectively called by the capture processor 124 or other capture components when needed or at various times. In 304, the keystroke capture component can determine the client application in focus. The application in focus is the client application currently being used by the user 112a. For example, it can be the client application that the user 112a is inputting text in. In one embodiment, the application in focus is determined so that the keystroke capture component can use the keystroke table associated with the application in focus from the keystroke database. For example, if the application in focus is a specific word processing application, the keystroke capture component can call up the corresponding specific word processing application keystroke table.

In 306, the event data is reset by the keystroke capture component. In one embodiment, event data is complied in an event in a format defined by an event schema and the keystroke capture component can register a specific keystroke capture event schema and resetting the event comprises clearing out any existing event data. A counter N can also be reset. In one embodiment, the counter counts the number of words captured by the keystroke capture component. In such embodiment, when the event is reset the counter is reset to zero.

In 308, the keystroke capture component captures a keystroke input by the user 112a. A user can input a keystroke through a variety of input devices, such as a keyboard. A keystroke can include a single key input or a multiple key input and can include a text input and an editing command input. For example, a keystroke can include the "G" key and the "Shift" and the "G" keys. A keystroke can also include the "Backspace" key and the "Control" and "Backspace" keys. The keystroke capture component can receive a keystroke by receiving keystroke messages through an application callback that can be invoked by the operating system. The keystroke capture component can also receive a keystroke through monitoring an input buffer, such as a keyboard buffer, at the operating system level. Other methods of inputting characters, such as handwriting, can be captured.

In 310, the keystroke capture component processes the keystroke. In the embodiment shown, the keystroke capture component processes the received keystroke by matching the keystroke to an entry in the keystroke table for the specific application in focus and determining the respective action for the keystroke. For example, if the received keystroke is the "SHIFT" key and the "G" key in a specific word processing application, the keystroke capture component matches the "SHIFT" key and the "G" key in the keystroke table for the specific application and can determine the associated action, for example, the output of the letter "G". If the received keystroke is the "Control" and "Backspace" keys, the keystroke capture component can match these keys with the respective action in the keystroke table for the specific application and determine the associated action, for example, the action of deleting the word preceding the cursor. Other possible actions include moving the cursor up or down one line, moving the cursor up or down one paragraph, and moving the cursor to the beginning or end of a document, for example. The keystroke capture component can keep track of the current position of the cursor with respect to previous characters entered. For example, if the user types 5 characters, hits "left arrow" three times, types one character, and hits "right arrow" three times, the component can identify that the user went back and inserted a character in the word (for applications where "left arrow" corresponds with moving the cursor back one character). The component can further keep track of whether each application is in "insert" mode, so that it knows if new characters overlay any existing characters.

In another embodiment, the keystroke capture component may not process the keystrokes directly. Instead, the keystroke capture component may first pass keystrokes to the operating system, as if the user had actively sent them to the keyboard capture component, and not an application. In this way, the operating system can do the work of translating keystrokes into higher level messages (characters, key movement, etc.), and can then return these messages to the keystroke capture component for further processing. Sending keystrokes to the operating system for intermediate processing, instead of processing them directly, may be advantageous for several reasons. For example, it may avoid some of the difficulties of handling multi-keystroke characters (including non-English character entry), and it may ensure keystrokes get processed in a manner that is consistent with operating system behavior.

In 312, the keystroke capture component adds the processed keystroke to the event data. In the embodiment shown, the keystroke capture component captures event data in as described by the event schema and the processed keystroke is added to the event data. For example, if the processed keystroke indicates the addition of the letter G, the letter G is added to the event data. If the processed keystroke indicates to delete the word preceding the cursor and a word is contained in the event data this word can be deleted. Additionally, the keystroke capture component can add the processed keystroke to a capture state. The keystroke capture component can maintain the capture state containing previous keystrokes as it is determined what recent word(s) the user has entered. The capture state can be updated before an event is generated.

In 314, the keystroke capture component determines if a complete word has been added to the event. A word can be a series of characters representing a spoken word, abbreviation, term, or semantic unit. For example, "WORLD SERIES", "ASCII", "MR" and "GOOGLE" can be words. The keystroke capture component can determine if a complete word has been entered by a variety of methods. In one embodiment, the keystroke capture component looks for a series of characters followed by a space, such as "GOOGLE", or certain punctuation characters, such as "GOOGLE," to determine if a complete word has been entered. If a complete word has not been entered, then the keystroke capture component goes to step 316. In 316, the keystroke capture component can determine whether the application previously in focus is still in focus or if the application in focus has changed and another application is now in focus. If the application in focus has not changed, the keystroke capture component returns to step 308 and receives another keystroke. If the application in focus has changed, the keystroke capture component returns to step 304 and determines the current application in focus. If the keystroke capture component identifies an action such as moving the cursor up one line, it may update the capture state to reflect the new cursor location. If the keystroke capture component does not have the capture state for that location, or cannot accurately pinpoint the new location, it may simply reset any partially captured word. As another example, the keystroke "shift left arrow" may select the previous character in a particular application. The keystroke capture component can recognize this action and possible subsequent actions such as deleting the selection or pasting the selection elsewhere in the document.

If, in step 314, the keystroke capture component determines that a complete word has been received, then in step 318 the counter N is incremented by one. In step 320, the capture processor determines if the counter N equals an integer T. The integer T can be, for example, a number of words. The number of words can be predetermined or can be determined based on a variety of suitable factors, such as the current application in focus or other user activity. In one example, T equals one so that the keystroke capture component may create an event upon the identification of each word entered by the user 112a. Alternatively, T can be a number of characters. Like the number of words, the number of characters can be predetermined or can be determined based on a variety of suitable factors. If, in step 320, N is found not to equal T, then the keystroke capture component goes to step 316, where the keystroke capture component determines if the application in focus has changed. If the keystroke capture component determines that N does equal T, then the keystroke capture component proceeds to step 322. For example, if N is a counter counting the number of words captured and T is set to one and "GOGGLE" is received, then the keystroke capture component proceeds to step 322.

In 322, the keystroke capture component compiles the event. In the embodiment shown, the keystroke capture component compiles the event by compiling the event data associated with specific fields described by the event schema. For example, the event data can include the application used for the input, the format of the text, the word or words input, and the time input. When the keystroke capture component has compiled the event, the method 200 can continue at step 204 as shown in FIG. 2.

Figure 4:
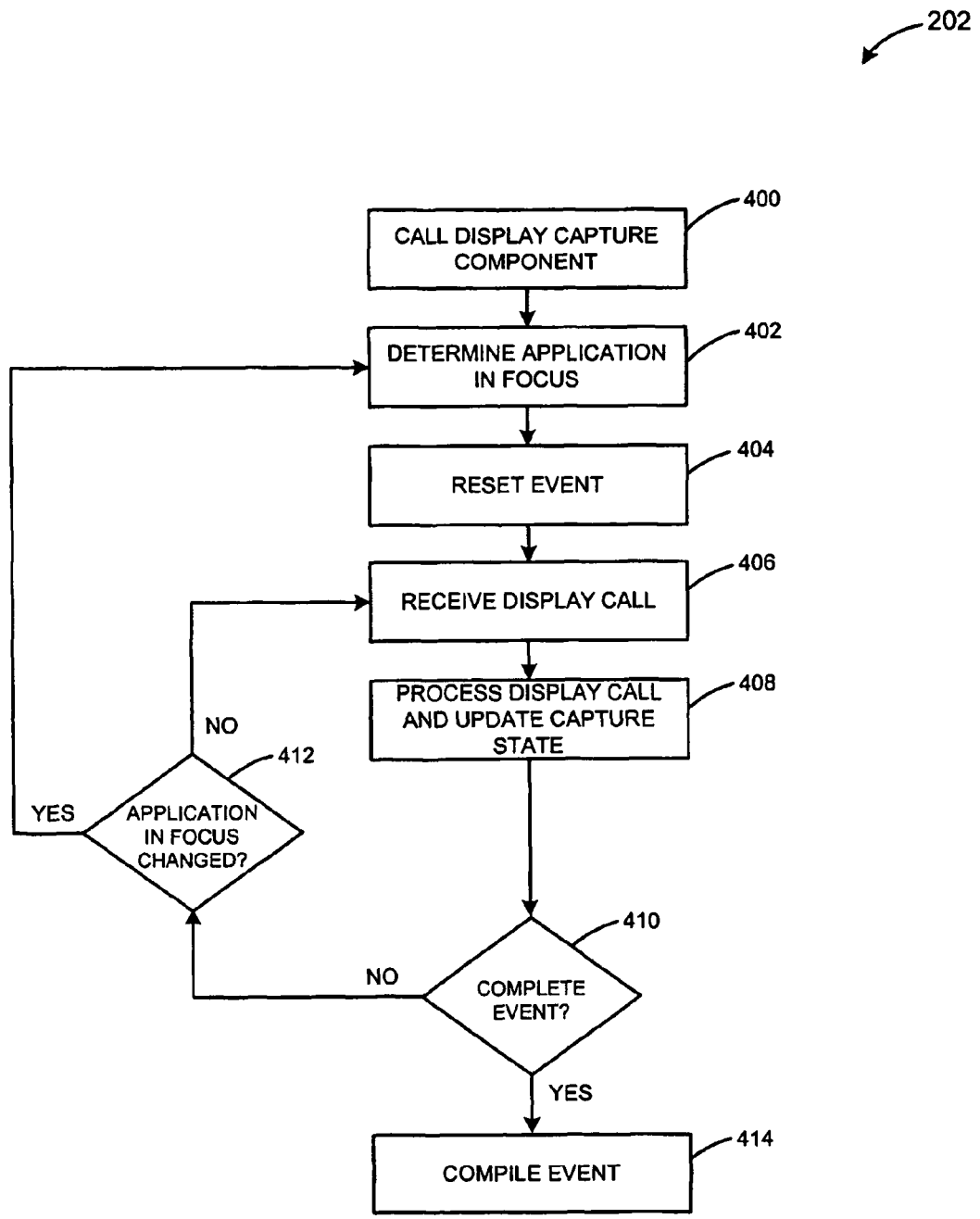
FIG. 4 is a flow diagram illustrating an exemplary method of capturing display information on a client device in one embodiment of the present invention.

FIG. 4 provides another example of capturing a real time event 202 shown in FIG. 2. Specifically, FIG. 4 illustrates an exemplary method for capturing display calls to display information on a display device associated with client device 102a. In 400, the display capture component is called. The display capture component can operate regularly or even constantly so that it monitors all display activity or can be selectively called by the capture processor 124 or other capture components when needed or at various times.

In 402, the display capture component determines the application in focus. The application in focus is the client application currently being used by the user 112a. For example, in a windows based operating system environment the display capture component determines which window the user is actively using.

In 404, the display capture component resets the event. The display capture component resets an event for a variety of reasons, such as the user has switched the application in focus, an event has been captured and sent to the queue 126, or a variety of other reasons. In one embodiment, the display capture component captures an event by placing event data in an event format according to an event schema and can reset the event by indicating a new event. In one embodiment, any existing event data previously determined and associated with a previous event may be saved. The existing event data can be saved in a capture state maintained by the display capture component. In another embodiment, the indication of a new event may trigger the sending of the existing event data in an event to the queue 126, for example.

In 406, the display capture component receives a display call. A display call can be an instruction sent by the operating system to the display device associated with the client device that instructs the display device to display an item or change the display of an item on the display device. For example, the display call can be to display the text "Google" in font "Times New Roman" at a display position, such as position x,y. This display call can, for example, cause the display on the screen of a computer monitor of the text "Google" at the position x,y in the active window and in the font "Times New Roman". A display call can also be, for example, to delete an item at a given position, change the font of a word, or change the position of an item on the display. The display calls can be determined by injecting code into applications or through the use of Dynamic Link Libraries (DLL) to hook and intercept operating system Application Programming Interface (API) calls. Other methods of output, such as calls to a printer driver, can be captured.

In 408, the display capture component processes the display call to determine the current display. The display can be what the user sees in the current display window. In the embodiment shown, the display capture component keeps an array of items that have been written in the current display. The display capture component can use the x and y coordinates of the items to determine words, spaces between words and the beginning of a new line. The display call may be used by the display capture component to update the array of the current display. For example, if the display call is to write the text "Google" in font "Times New Roman" at position x,y then the text "Google" in font "Times New Roman" is added to the display at position x,y. The updated array associated with the current display can then be added to the event. The capture state can also be updated with the updated array by the display capture component.

In 410, the display capture component determines whether a complete event has occurred. For example, an event can occur after a single word is added to the display on the display device. Alternatively, an event can occur after a predetermined number of words have been displayed. The display capture component can use the updated array of displayed items by using the x and y coordinates of items in the array to determine words and spaces between words to determine if an event has occurred. If the display capture component determines that a complete event has not yet occurred, then the display capture component proceeds to step 412. In 412, the display capture component determines whether the application in focus has changed. If the application in focus has not changed, the display capture component receives the next display call at 406. If the application in focus has changed, the display capture component determines the application in focus at 402.

If the display capture component determines that a complete event has occurred then the display capture component proceeds to 414. In 414, the display capture component can compile the event. In the embodiment shown the display capture component compiles the event by providing all the event data described in an event schema. For example, the event data can include the application used, the format of the display, the time of display, the content displayed, the font and font size of any words displayed and any other data that can be used to define the event. Once the event is captured, the method proceeds with step 204 in FIG. 2. The keystroke capture component and the display capture component can be used together to determine user activity, for example, what the user is viewing on a visual output device, such as a display.

Returning to FIG. 2, in 204, the capture processor 124 determines whether the event captured is an indexable event. As explained above, some real-time events may not be indexed (non-indexable real-time events). In one embodiment, non-indexable real-time events are used to update the current user state and are, for example, examining a portion of an article; changing an article, and closing an article. In this embodiment, non-indexable events are not indexed or sent for storage by the indexer 130. Indexable events can be indexable real-time events or historical events. Keystrokes and display calls can be non-indexable events, such as the input of a number of words by a user or the display of a number of words on a display device. Keystrokes and display calls can also be indexable events, such as, for example, when an entire article or portion of an article is input by a user or displayed on a display device.

If an indexable event is determined, then, in 206, the event can be sent by the capture processor 124 to the queue 126 with an indication that it is an indexable event. In the embodiment shown in FIG. 1, indexable real-time events are sent to both a user state queue and an index queue within queue 126 and historical events are sent to the index queue within the queue 126. Alternatively, indexable real-time events may not be sent to the user state queue to save computational time. The capture processor 124 can send the event in a form described by an event schema to the queue 126.

If the event is determined to be a non-indexable event, then, in 206, the non-indexable event can be sent by the capture processor 124 to the user state queue of the queue 126 with an indication that it is not to be indexed. For example, when a user is composing an email a capture component can capture a number of words input by the user in the composition of the email. A capture component can capture the input text as an event. While this event can be helpful in determining a current state of the user 112a, it may not be important enough to be indexed and sent for storage by the search engine, so that the user may later retrieve this information. Alternatively, for an example where a user opens a received email, while this event can provide information on a current user state, it can also be indexed and sent for storage by the search engine 122, because the user 112a may later be interested in retrieving this email.

In one embodiment, the queue 126 holds the event until the search engine is ready to receive it. Based on the event data, the event can be prioritized on the queue 126 for handling. For example, historical events are given a lower priority for processing by the queue 126 than real-time events. In one embodiment, when the indexer 130 is ready to process another event, it can retrieve an event or events from the index queue in the queue 126. The query system 132 can retrieve an event or events from the user state queue of the queue 126, when it is ready to update the user state. In another embodiment, a queue is not used and events are sent directly to the search engine 122 from the capture processor 124.

In 208, the indexer 130 indexes and stores the event. The indexer 130 can retrieve an event from the queue 126 when it is ready to process the event. In one embodiment, the indexer 130 determines if the event is a duplicate event and if not assigns an Event ID to the event. The indexer 130 can also associate the event with related events. In the embodiment shown in FIG. 2, using the event schema, the indexer determines indexable terms associated with the event, dates and times associated with the event, and other data associated with the event. The indexer 130 can associate the Event ID with the indexable terms that are contained in the index 142. The event can be stored in the database 144 and the content of the event can be stored in the repository 146.

The environment shown reflects a client-side search engine architecture embodiment. Other embodiments are possible, such as a stand alone client device or a network search engine.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A computer-implemented method for a capture processor executing on a computer to determine an event associated with an application, comprising:
    receiving, with the capture processor, a plurality of keystrokes associated with a first application with focus monitored by the capture processor, the first application with focus comprising an application being used by a user of the computer to enter text;
    determining, with the capture processor, that focus has changed from the first application monitored by the capture processor to a second application monitored by the capture processor, wherein focus changes when the user switches from using the first application to using the second application to enter text;
    resetting, with the capture processor, the keystrokes received from the first application by clearing the received keystrokes responsive to determining that the focus has changed;
    receiving, with the capture processor, a plurality of new keystrokes associated with the second application;
    processing, with the capture processor, each new keystroke to determine an associated action in the second application, the plurality of new keystrokes forming a plurality of associated actions;
    analyzing, with the capture processor, the plurality of associated actions to determine whether a complete event has occurred in the second application; and
    selectively indexing the complete event responsive to determining that the complete event occurred.

2. The method of claim 1, wherein the analyzing determines that a complete event has occurred responsive to the plurality of associated actions indicating that a complete word has been entered into the application.

3. The method of claim 2, wherein the analysis determines that a complete word has been entered responsive to the plurality of associated actions indicating that a space or a punctuation symbol has been entered.

4. The method of claim 1, wherein the analyzing determines that a complete event has occurred responsive to the plurality of associated actions indicating that a predetermined number of characters have been typed into the application.

5. The method of claim 1, further comprising updating, with the capture processor, a capture state after each keystroke is processed.

6. The method of claim 1, further comprising updating, with the capture processor, a current user state based at least in part on the event.

7. The method of claim 1, wherein an associated action comprises one of adding a character to a word, deleting a character from a word, inserting a character, overwriting a character, deleting a word, deleting a paragraph, selecting an item, and repositioning the cursor.

8. The method of claim 1, wherein the associated action is determined based at least in part by matching a keystroke to a keystroke table and wherein the keystroke table is associated with the application and wherein different applications are associated with different keystroke tables.

9. The method of claim 1, wherein the associated action is determined based at least in part by matching a keystroke to a generic keystroke table common to a plurality of applications.

10. A computer-implemented method for a capture processor executing on a computer to determine and selectively index an event associated with an application, comprising:

receiving, with the capture processor, a plurality of display calls associated with a first application with focus monitored by the capture processor, the first application with focus comprising an application being used by a user of the computer to enter text;

determining, with the capture processor, that focus has changed from the first application monitored by the capture processor to a second application monitored by the capture processor, wherein focus changes when the user switches from using the first application to using the second application to enter text;

resetting, with the capture processor, the display calls received from the first application by clearing the received display calls responsive to determining that the focus has changed;

receiving, with the capture processor, a plurality of new display calls associated with the second application;

processing, with the capture processor, the plurality of new display calls to determine a display produced by the second application;

analyzing, with the capture processor, the display produced by the second application to determine whether a complete event has occurred in the second application;

determining, with the capture processor, an importance of the complete event; and selectively indexing, with the capture processor, the complete event responsive to the importance of the complete event.

11. The method of claim 10, wherein the analyzing determines that a complete event has occurred responsive to the display indicating that a complete word has been entered into the application.

12. The method of claim 10, further comprising updating, with the capture processor, a capture state after each display call is processed.

13. The method of claim 10, further comprising updating, with the capture processor, a current user state based at least in part on the event.

14. The method of claim 10, wherein the display is determined at least in part by using an array of a current state of the display and updating the array with the display call, and wherein the analyzing comprises analyzing the array to determine whether a complete event has occurred.

15. The method of claim 10, wherein the display is determined at least in part by constructing display items based at least in part on display positions of the display calls.

16. The method of claim 10, wherein processing the plurality of display calls to determine a display comprises analyzing one or more of the x,y coordinates, lengths, and relative positions of a plurality of items written to the display using display calls.

17. A computer-readable storage medium for causing a capture processor to determine and selectively index an event associated with an application, the computer-readable storage medium containing executable program code comprising:

program code configured to receive a plurality of keystrokes associated with a first application with focus monitored by the capture processor, the first application with focus comprising an application being used by a user of the computer to enter text;

program code configured to determine that focus has changed from the current application monitored by the capture processor to a second application monitored by the capture processor, wherein focus changes when the user switches from using the first application to using the second application to enter text;

program code configured to reset keystrokes received from the first application by clearing the received keystrokes responsive to determining that the focus has changed;

program code configured to receive a plurality of new keystrokes associated with the second application;

program code configured to process each new keystroke to determine an associated action in the second application, the plurality of new keystrokes forming a plurality of associated actions;

program code configured to analyze the plurality of associated actions to determine whether a complete event has occurred in the second application;

program code configured to selectively index the complete event responsive to the determining that the complete event occurred.

18. A computer-readable storage medium for causing a capture processor to determine and selectively index an event associated with an application, the computer-readable storage medium containing executable program code comprising:

program code configured to receive a plurality of display calls associated with a first application with focus monitored by the capture processor, the first application with focus comprising an application being used by a user of the computer to enter text;

program code configured to determine that focus has changed from the first application monitored by the capture processor to a second application monitored by the capture processor, wherein focus changes when the user switches from using the first application to using the second application to enter text;

program code configured to reset display calls received from the first application by clearing the received display calls responsive to determining that the focus has changed;

program code configured to receive a plurality of new display calls associated with the second application;

program code configured to process the plurality of new display calls to determine a display produced by the second application;

program code configured to analyze the display produced by the second application to determine whether a complete event has occurred in the second application;

program code configured to determine an importance of the complete event; and program code configured to selectively index the complete event responsive to the importance of the complete event.

19. The method of claim 1, wherein the analyzing determines that a complete event has occurred responsive to the plurality of associated actions indicating that a predetermined number of words have been typed into the application.

20. The method of claim 1, wherein the resetting the keystrokes captured from the first application comprises saving the keystrokes before clearing the keystrokes.

* * * * *

UNITED STATES PATENT AND TRADEMARK OFFICE
CERTIFICATE OF CORRECTION

| | | |
|---|---|---|
| PATENT NO. | : 7,941,439 B1 | Page 1 of 1 |
| APPLICATION NO. | : 10/814773 | |
| DATED | : May 10, 2011 | |
| INVENTOR(S) | : Stephen R. Lawrence et al. | |

It is certified that error appears in the above-identified patent and that said Letters Patent is hereby corrected as shown below:

Claim 17, col. 18 line 18, insert --and-- after "the second application;".

Signed and Sealed this
Fourth Day of October, 2011

David J. Kappos
*Director of the United States Patent and Trademark Office*